Patented Sept. 27, 1949

2,482,858

UNITED STATES PATENT OFFICE 2,482,858

CELLULOSE PURIFICATION

Mervin E. Martin, Cumberland, Md., and Morris Umansky, Summit, N. J., assignors to Celanese Corporation of America, a corporation of Delaware No Drawing. Application August 13, 1947, Serial No. 768,487

10 Claims. (Cl. 8—105)

This invention relates to the purification of wood pulp cellulose, and relates more particularly to the purification of unbleached wood pulp cellulose obtained by the sulfite process.

An object of this invention is to provide an improved process for the purification of unbleached sulfite wood pulp cellulose to render said cellulose suitable for the production of organic derivatives of cellulose, such as cellulose esters and cellulose ethers, which are adapted to be employed for the preparation of filaments, yarns, films, foils, molded articles and the like.

Another object of this invention is the provision of an improved process for the treatment of unbleached sulfite wood pulp cellulose whereby the cellulose may be highly purified and the purification effected in an efficient and economical manner.

Other objects of this invention will appear from the following detailed description.

Purified cellulose obtained from wood and suitable for use in the preparation of organic derivatives of cellulose by esterification or etherification procedures, is usually referred to as chemical or dissolving pulp. This material must meet rigid chemical standards of purity if cellulose derivatives prepared therefrom are to yield filaments, yarns, films, foils, molded materials and the like which are commercially satisfactory. While various wood pulping processes yield cellulosic materials suitable for paper making and the like, the raw wood pulp is not sufficiently pure for chemical conversion. Unbleached sulfite wood pulp, for example, is quit unsuitable for the preparation of organic acid esters of cellulose. The lignin and pentosan content of the unbleached sulfite wood pulp, as well as the presence of certain color-producing materials therein, yields cellulose esters, on esterification, which are not entirely soluble in the usual solvents employed in yarn-spinning and film-casting operations. In addition, the cellulose esters thus obtained do not have the high clarity and the freedom from haze and color necessary for satisfactory commercial application. Accordingly, unbleached sulfite wood pulp cellulose must be subjected to further purification, if it is desired to produce satisfactory organic acid esters of cellulose, cellulose ethers or other cellulose derivatives therefrom.

We have now found that unbleached sulfite wood pulp may be converted to chemical or dissolving wood pulp of a high degree of purity and suitable for conversion into organic acid esters of cellulose, cellulose ethers or other cellulose derivatives of high quality if said unbleached sulfite wood pulp is subjected to an improved purification process involving a novel sequence of purification steps wherein the concentration and temperature of the chemical treatments as well as the time are all closely controlled.

In accordance with the novel purification process of our invention, commercial unbleached sulfite wood pulp is digested for a short period of time with dilute aqueous alkali, washed neutral with water, chlorinated with free chlorine, washed with hot dilute alkali, washed neutral with water, digested again in dilute aqueous alkali, washed neutral, bleached with a hypochlorite and finally, washed neutral with distilled water. The above purification process effects a substantial increase in the alpha cellulose content of the wood pulp, a decrease in the pentosans present and, in addition, eliminates the lignin and color-forming materials originally present in the unbleached sulfite pulp prior to purification. The purified wood pulp cellulose thus obtained, when converted into organic derivatives of cellulose by suitable esterification or etherification processes, yields products which are highly satisfactory with respect to clarity, color, solubility and stability when formed into yarns, filaments, films, foils and molded articles by suitable operations. The purified wood pulp cellulose obtained by our novel process is particularly valuable for conversion into organic acid esters of cellulose, such as cellulose acetate and cellulose propionate. The process of our invention offers an efficient and economical process for converting unbleached sulfite wood pulp into the valuable chemical or dissolving wood pulp with relatively few operations being required. In addition, our novel process may be carried out in a substantially continuous manner.

Thus, in accordance with our novel process, commercial unbleached sulfite wood pulp is disintegrated in any convenient manner and the disintegrated pulp formed into a slurry with a 0.35 to 0.60% by weight, e. g. 0.5%, aqueous sodium hydroxide solution, with sufficient pulp being added to comprise about 7% by weight of the slurry. The mixture is then heated in a suitable digester for about 15 minutes under pressure at a temperature of about 120 to 135° C. Optimum results are achieved when a temperature of 135° C. is employed. The digested pulp is then washed neutral to phenolphthalein with water. The neutral pulp is then formed into an aqueous slurry containing 1 to 3.0%, e. g. 2%, by weight of the pulp and sufficient chlorine is added to comprise from 1 to 2½%, e. g. 1.5%, available chlorine on the weight of the pulp. Chlorination is effected at 10 to 20° C. for about 30 minutes. Sufficient sodium sulfite, is then added to the slurry to halt further chlorination and the chlorinated pulp washed at about 40 to 70° C., e. g. 50° C., with a 0.025 to 0.30% by weight, e. g. 0.25%, aqueous solution of sodium hydroxide. The pulp is then digested again as a 7% by weight slurry with a 0.75 to 1.5% by weight, e. g. 0.75%, aqueous sodium hydroxide solution for about 15 minutes under pressure at a temperature of about 120 to 135° C. The use of the higher temperature, i. e. about 135° C., is also preferred for the second alkali digestion. After being washed neutral to phenolphthalein with water, the digested pulp is then subjected to a bleaching operation employing an aqueous solution of a hypochlorite, such as sodium hypochlorite. The bleaching may be effected in but a single stage, employing sufficient hypochlorite to yield about 0.5 to 1.0%, e. g. 0.5%, available chlorine on the weight of the pulp, a slurry containing about 2% by weight of pulp being formed for effecting the bleach. The bleaching bath is preferably adjusted to a pH of 9.0 to 9.2 with sodium hydroxide solution when a single-stage bleach is employed, and bleaching for about one hour with the aqueous hypochlorite solution at about 35° C. has been found to be quite satisfactory. Bleaching is halted by employing sulfur dioxide and the bleached pulp is then washed neutral to bromthymol blue with distilled water. The neutral pulp may then be dried in the usual manner, preferably in sheet form, for ease of handling.

However, we prefer to effect the bleaching in two stages. The two-stage bleaching procedure is preferably employed since it produces a pulp which, after esterification, yields yarn having considerably improved color over a yarn produced from pulp subjected to a single-stage bleach and esterified. Where a two-stage hypochlorite bleach is employed, sufficient pulp may be added to the aqueous hypochlorite solution to form a slurry containing 4% by weight of pulp. The pH of the aqueous hypochlorite solution in the first bleaching stage is preferably adjusted by the use of a sodium hydroxide solution to 10 to 10.5 with the available chlorine being about 0.75% by weight on the pulp. In the second stage the pH is preferably adjusted to about 8.5, with the available chlorine present being about 0.5% on the weight of the pulp. The two-stage bleaching is preferably effected with the bleaching solution at a temperature of 35° C., the duration being about two hours for each stage. Following the final bleach of the two-stage process, the bleached pulp is washed neutral with distilled water employing bromthymol blue as the indicator. The neutral pulp is then dried.

In order further to illustrate our invention, but without being limited thereto, the following examples are given:

*Example I*

Unbleached sulfite wood pulp is disintegrated and is added to a sufficient amount of a 0.5% by weight aqueous solution of sodium hydroxide to form a slurry containing about 7% by weight of wood pulp. The slurry is entered into a digester and cooked for 15 minutes at about 120° C. and under pressure. After digestion, the pulp is discharged into a washer and washed neutral to phenolphthalein with water. The neutral pulp is then transferred to a glass-lined vessel for chlorination. Sufficient aqueous chlorine solution is added to form a 2% by weight pulp slurry with 1.5% available chlorine on the weight of the pulp being present. After chlorination for 30 minutes, further chlorination is halted by the addition of sodium sulfite and the chlorinated pulp obtained is then washed with an aqueous sodium hydroxide solution, containing 0.25% by weight of sodium hydroxide, heated to 50° C. The pulp is washed neutral to phenolphthalein with water and again digested with aqueous sodium hydroxide. The aqueous sodium hydroxide solution employed for the second digestion contains 0.75% by weight of sodium hydroxide and sufficient of the dilute alkali solution is employed so that the pulp present comprises 7% by weight of the resulting slurry. The digester is heated and the pulp digested for 15 minutes under pressure at a temperature of 135° C. After digestion is completed the pressure is released, the pulp discharged and washed neutral to phenolphthalein with water. The neutral pulp is then subjected to a bleach employing an aqueous solution of sodium hypochlorite made up with distilled water. The pH is adjusted to from 9.0 to 9.2 and the pulp is charged into a sufficient amount of the solution to make a slurry containing 2% by weight of pulp, with 0.5% of available chlorine being present on the weight of the pulp. The bleaching solution is heated to 35° C. and held at this temperature for one hour. Bleaching is halted by the addition of sufficient sulfur dioxide to bring the pH down to 4. The bleached pulp is then discharged to a washer when it is washed neutral to bromthymol blue with distilled water. After centrifuging to reduce the water content, the pulp is dried at 122° C. for about one hour. A yield of purified wood pulp of from 75 to 80% based on the weight of the unbleached sulfite wood pulp originally employed is obtained by our novel process. The purified wood pulp obtained contains 94.7% by weight of alpha cellulose, about 2% of pentosan and is free of lignin. The original unbleached sulfite wood pulp contained 87.4% of alpha cellulose, 3.9% of pentosans and 2.9% of lignin.

*Example II*

Unbleached sulfite wood pulp is disintegrated formed into a 7% by weight slurry with 0.5% aqueous sodium hydroxide and digested from 15 minutes at a temperature of 135° C. under pressure. The digested pulp is dicharged from the digester and washed neutral to phenolphthalein with water. The neutral pulp is then entered into a glass-lined vessel and chlorinated with aqueous chlorine containing 1.5% of available chlorine on the weight of the pulp, the pulp comprising 2% by weight of the mixture. After chlorination for about 30 minutes, the reaction is halted by the addition of sodium sulfite and the chlorinated pulp is then washed with a 0.25% aqueous solution of sodium hydroxide at a temperature of 50° C. After this sodium hydroxide wash, the pulp is washed neutral to phenolphthalein with water and is then digested again under pressure for 15 minutes at a temperature of 135° C. in a 0.75% by weight aqueous solution of sodium hydroxide, the pulp comprising 7% by weight of the dilute alkaline slurry in the digester. After digestion is completed, the pressure is released and the pulp is again washed neutral to phenolphthalein with water. The digested pulp is then bleached for 2 hours at 35° C. with an aqueous solution of sodium hypochlorite having a pH of 10 to 10.5 and 0.75% available chlorine present. Sufficient aqueous sodium hypochlorite is employed during this bleach so that the pulp present comprises 4% by weight of the solution. After this bleach the pulp is discharged and is then subjected to a second bleach in an aqueous sodium hypochlorite solution having a pH of 8.5 and 0.5% available chlorine present. Bleaching is carried out for two hours at 35° C. with the pulp comprising 4% by weight of the aqueous slurry. Bleaching is halted by the addition of sulfur dioxide and the pulp is then washed neutral to bromthymol blue with distilled water. After being centrifuged the pulp is then dried. A yield of purified wood pulp of 75 to 80% by weight on the original sulfite wood pulp is obtained. The purified wood pulp obtained contains 93.0% of alpha cellulose, 1.5% of pentosans and is completely free of lignin. The original unbleached sulfite wood pulp employed contained only 86% of alpha cellulose and has 3.8% by weight of pentosans and 3.8% of lignin. The analysis of the pulp is carried out in accordance with the standard Tappi methods.

*Example III*

Unbleached wood pulp is disintegrated, formed into a 7% by weight slurry with 0.5% aqueous sodium hydroxide and digested for 15 minutes at a temperature of 135° C. under pressure. The digested pulp is discharged from the digester and washed neutral to phenolphthalein with water. The neutral pulp is then entered into a glass-lined vessel and chlorinated with aqueous chlorine containing 1.5% of available chlorine on the weight of the pulp, the pulp comprising 2% by weight of the mixture. After chlorination for about 30 minutes the reaction is halted by the addition of sodium sulfite and the chlorinated pulp is then washed with a 0.25% aqueous solution of sodium hydroxide at a temperature of 50° C. After this sodium hydroxide wash, the pulp is washed neutral to phenolphthalein with water, and is then bleached for two hours at 35° C. with an aqueous solution of sodium hypochlorite having a pH of 10 to 10.5 and 0.75% available chlorine present. Sufficient aqueous sodium hypochlorite is employed during this bleach so that the pulp present comprises 4% by weight of the solution. After this bleach, the bleached pulp is digested under pressure for 15 minutes at a temperature of 135° C. in a 0.75% by weight solution of sodium hydroxide, the pulp comprising 7% by weight of dilute alkaline slurry in the digester. After digestion is completed, the pressure is released and the pulp is again washed neutral to phenolphthalein with water. The digested pulp is again bleached, this time in an aqueous sodium hypochlorite solution having a pH of 8.5 and 0.5% available chlorine present. This second bleaching is carried out for two hours at 35° C. with the pulp comprising 4% by weight of the aqueous slurry. Bleaching is halted by the addition of sulfur dioxide and the pulp is then washed neutral to bromthymol blue with distilled water. After being centrifuged the pulp is then dried. The order of treatment set forth in this example is very important since it yields a pulp which, after esterification, produces yarn of considerably improved color.

The dried, purified wood pulp prepared in accordance with the above examples may be esterified or etherified by processes well-known in the art and cellulose derivatives of very desirable characteristics may be obtained. Examples of cellulose derivatives which may be prepared from the improved wood pulp prepared in accordance with our invention are cellulose esters, such as, for example, cellulose acetate, cellulose nitrate, cellulose propionate, and cellulose butyrate, mixed esters, such as cellulose acetate-propionate and cellulose acetate-butyrate, and cellulose ethers, such as ethyl cellulose and benzyl cellulose. The pulp may also be used advantageously for the preparation of regenerated cellulose foils, yarn and filaments by the viscose or cuprammonium processes.

It is to be understood that the foregoing detailed description is given merely by way of illustration and that many variations may be made therein without departing from the spirit of our invention.

Having described our invention, what we desire to secure by Letters Patent is:

1. Process for the treatment of unbleached sulfite wood pulp, which comprises digesting sulfite wood pulp with a dilute aqueous alkaline solution, chlorinating the digested pulp, washing with a dilute aqueous alkaline solution, digesting the washed chlorinated pulp under super-atmospheric pressure in a dilute aqueous alkaline solution, and then subjecting said digested pulp to bleaching with an aqueous hypochlorite solution.

2. Process for the treatment of unbleached sulfite wood pulp, which comprises digesting sulfite wood pulp with a dilute aqueous sodium hydroxide solution, chlorinating the digested pulp, washing with a dilute aqueous sodium hydroxide solution, digesting the washed chlorinated pulp under super-atmospheric pressure in a dilute aqueous sodium hydroxide solution, and then subjecting said digested pulp to bleaching with an aqueous hypochlorite solution.

3. Process for the treatment of unbleached sulfite wood pulp, which comprises digesting sulfite wood pulp with a dilute aqueous sodium hydroxide solution, chlorinating the digested pulp, washing with a dilute aqueous sodium hydroxide solution, bleaching the so-treated digested pulp, digesting the bleached pulp under super-atmospheric pressure in a dilute aqueous sodium hydroxide solution, and then subjecting said digested pulp to a second bleaching with an aqueous sodium hypochlorite solution.

4. Process for the treatment of unbleached sulfite wood pulp, which comprises digesting sulfite wood pulp with 0.35 to 0.60% by weight aqueous sodium hydroxide solution, chlorinating the digested pulp with an aqueous chlorine solution containing 1 to 2½% on the weight of the pulp of available chlorine, washing the chlorinated pulp with a 0.025 to 0.30% by weight aqueous sodium hydroxide solution, digesting the washed chlorinated pulp under super-atmospheric pressure in a 0.75 to 1.5% by weight aqueous sodium hydroxide solution, and then subjecting said digested pulp to bleaching with an aqueous hypochlorite solution containing 0.5 to 1.0% by weight of available chlorine.

5. Process for the treatment of unbleached sulfite wood pulp, which comprises digesting sulfite wood pulp with a 0.35 to 0.60% by weight aqueous sodium hydroxide solution, chlorinating the digested pulp with an aqueous chlorine solution, containing 1 to 1½% on the weight of the pulp of available chlorine, washing the chlorinated pulp with a 0.025 to 0.30% by weight aqueous sodium hydroxide solution, digesting the washed chlorinated pulp under super-atmospheric pressure in a 0.75 to 1.5% by weight aqueous sodium hydroxide solution, and then subjecting said digested pulp to at least one bleach with an aqueous hypochlorite solution containing 0.5 to 1.0% by weight of available chlorine.

6. Process for the treatment of unbleached sulfite wood pulp, which comprises digesting sulfite wood pulp with a 0.35 to 0.60% by weight aqueous sodium hydroxide solution at 120 to 135° C., chlorinating the digested pulp with an aqueous chlorine solution containing 1.0 to 2½% on the weight of the pulp of available chlorine, washing the chlorineated pulp with a 0.025 to 0.30% by weight aqueous sodium hydroxide solution at 40 to 70° C., digesting the washed chlorinated pulp under super-atmospheric pressure in a 0.75 to 1.5% by weight aqueous sodium hydroxide solution at 120 to 135° C., and then subjecting said digested pulp to at least one bleach with an aqueous hypochlorite solution containing 0.5 to 1.0% by weight of available chlorine.

7. Process for the treatment of unbleached sulfite wood pulp, which comprises digesting sulfite wood pulp with a 0.35 to 0.60% by weight aqueous sodium hydroxide solution at 120 to 135° C. chlorinating the digested pulp with an aqueous chlorine solution containing 1 to 2½% on the weight of the pulp of available chlorine, washing the chlorinated pulp with a 0.025 to 0.30% by weight aqueous sodium hydroxide solution at 40 to 70° C., digesting the washed chlorinated pulp under super-atmospheric pressure in a 0.75 to 1.5% by weight aqueous sodium hydroxide solution at 120 to 135° C., and then subjecting said digested pulp to at least one bleach with an aqueous hypochlorite solution containing 0.5 to 1.0% by weight of available chlorine, said pulp being washed neutral with water between each of said treatments.

8. Process for the treatment of unbleached sulfite wood pulp, which comprises digesting the sulfite wood pulp with a 0.5% by weight sodium hydroxide solution for 15 minutes at 120° C. washing the pulp neutral with water, chlorinating the neutral pulp for 30 minutes with an aqueous chlorine solution containing 1.5% by weight on the pulp of available chlorine, washing the chlorinated pulp with an 0.25% by weight aqueous solution of sodium hydroxide at 50° C., washing the pulp neutral with water, digesting the neutral pulp under super-atmospheric pressure for 15 minutes at 135° C., washing the digested pulp neutral with water, and then subjecting said neutral pulp to bleaching for one hour at 35° C. with an aqueous sodium hypochlorite solution at a pH of 9.0 to 9.2 containing 0.5% of available chlorine on the weight of the pulp, washing the bleached pulp neutral with distilled water and drying the same.

9. A process for the treatment of unbleached sulfite wood pulp which comprises digesting the sulfite wood pulp with a 0.5% aqueous sodium hydroxide solution for 15 minutes at a temperature of 135° C., washing the pulp neutral with water, chlorinating the neutral pulp for 30 minutes with an aqueous chlorine solution containing a 1.5% by weight on the pulp of available chlorine, washing the chlorinated pulp with a 0.25% by weight aqueous solution of sodium hydroxide at 50° C., washing the pulp neutral with water, digesting the neutral pulp under super-atmospheric pressure for 15 minutes at 135° C. in a 0.75% by weight aqueous solution of sodium hydroxide, washing the digested pulp neutral, bleaching the neutral pulp for two hours at 35° C. with an aqueous solution of sodium hypochlorite having a pH of 10 to 10.5 and 0.75% on the weight of the pulp of available chlorine present, again bleaching the pulp for two hours at 35° C. with an aqueous solution of sodium hypochlorite having a pH of 8.5 with 0.5% on the weight of the pulp of available chlorine present, washing the bleached pulp neutral with distilled water and then drying the pulp.

10. A process for the treatment of unbleached sulfite wood pulp which comprises digesting the sulfite wood pulp with a 0.5% aqueous sodium hydroxide solution for 15 minutes at a temperature of 135° C., washing the pulp neutral with water, chlorinating the neutral pulp for 30 minutes with an aqueous chlorine solution containing a 1.5% by weight on the pulp of available chlorine, washing the chlorinated pulp with a 0.25% by weight aqueous solution of sodium hydroxide at 50° C., washing the pulp neutral with water, bleaching the neutral pulp for two hours at 35° C. with an aqueous solution of sodium hypochlorite having a pH of 10 to 10.5 and 0.75% on the weight of the pulp of available chlorine present, digesting the bleached pulp under super-atmospheric pressure for 15 minutes at 135° C. in a 0.75% by weight aqueous solution of sodium hydroxide, again bleaching the pulp for two hours at 35° C. with an aqueous solution of sodium hypochlorite having a pH of 8.5 with 0.5% on the weight of the pulp of available chlorine present, washing the bleached pulp neutral with distilled water and then drying the pulp.

MERVIN E. MARTIN.
MORRIS UMANSKY.

REFERENCES CITED

The following references are of record in the file of this patent:

UNITED STATES PATENTS

| Number | Name | Date |
|---|---|---|
| 1,283,114 | Drewson | Oct. 29, 1918 |
| 2,070,893 | Glass | Feb. 16, 1937 |
| 2,098,111 | Sconce | Nov. 2, 1937 |
| 2,226,356 | McCarthy | Dec. 24, 1940 |
| 2,228,127 | Richter | Jan. 7, 1941 |
| 2,408,849 | Haney et al. | Oct. 8, 1946 |

OTHER REFERENCES

Sprout, "Comparative Studies in the Chlorination of Woodpulp," Paper Trade J., Mar. 13, 1947, page 45.

Certificate of Correction

Patent No. 2,482,858 September 27, 1949

MERVIN E. MARTIN ET AL.

It is hereby certified that errors appear in the printed specification of the above numbered patent requiring correction as follows:

Column 1, line 34, for "quit" read *quite*; column 5, line 19, for "93.0%" read *93.4%*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*